United States Patent [19]

Camp

[11] 4,072,849
[45] Feb. 7, 1978

[54] APPARATUS AND METHOD FOR CALCULATING VEHICLE MOVEMENT PARAMETERS

[76] Inventor: William J. Camp, 14 B Glendale Manor, Pleasantville, N.J. 08232

[21] Appl. No.: 171,456

[22] Filed: Aug. 13, 1971

[51] Int. Cl.² ............................................. G06K 1/00
[52] U.S. Cl. ............................ 235/61 NV; 235/78 N; 58/127 R
[58] Field of Search ................ 235/78 N, 88 N, 61 B, 235/61 NV, 61 S, 61 V; 58/127 R

[56] References Cited

U.S. PATENT DOCUMENTS

| | | | |
|---|---|---|---|
| 3,127,102 | 3/1964 | Fallis | 235/61 B |
| 3,220,643 | 11/1965 | Gorman | 235/61 NV |
| 3,282,501 | 11/1966 | Copeland | 235/61 NV X |
| 3,373,932 | 3/1968 | Copeland | 235/61 V |

FOREIGN PATENT DOCUMENTS 565,988  12/1944  United Kingdom ............... 235/61 B

*Primary Examiner*—Ulysses Weldon

*Attorney, Agent, or Firm*—Nelson E. Kimmelman

[57] ABSTRACT

An apparatus and method of calculating a vehicle's elevation, speed, distance and time to arrive at a predetermined point. The apparatus includes a mechanical spring-driven clock mechanism having a rotating settable pointer passing adjacent a clock face for visually ascertaining time measurement during a specified time interval. The clock face has a prescribed set of indicia formed thereon defining a nomograph which correlates the vehicle's speed and distance to the predetermined point. An outer annular ring movable with respect to the clock face provides indicia showing the vehicle's elevation at specific time points. Tab elements which are slideably moveable on the annular ring provide visual guides to important elevation points. A central pointer on the clock is set at the selected vehicle speed and distance measurements on the nomograph and relates to a proper vehicle elevation mark on the annular ring. At a specific time designation, the clock pointer movement is initiated. The apparatus then provides a continuous display of elevation, speed, distance and time to arrival at the predetermined point.

15 Claims, 6 Drawing Figures

INVENTOR
WILLIAM J. CAMP

BY

Maleson, Kimmelman + Ratner
ATTORNEYS

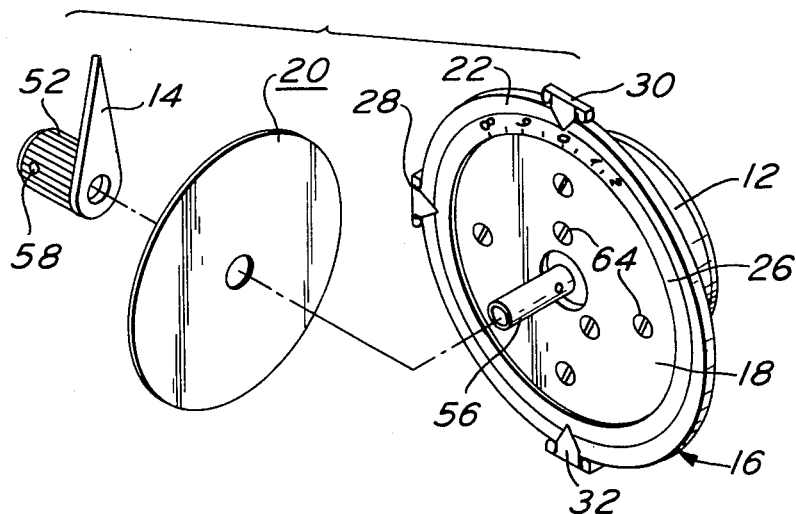
FIG. 3
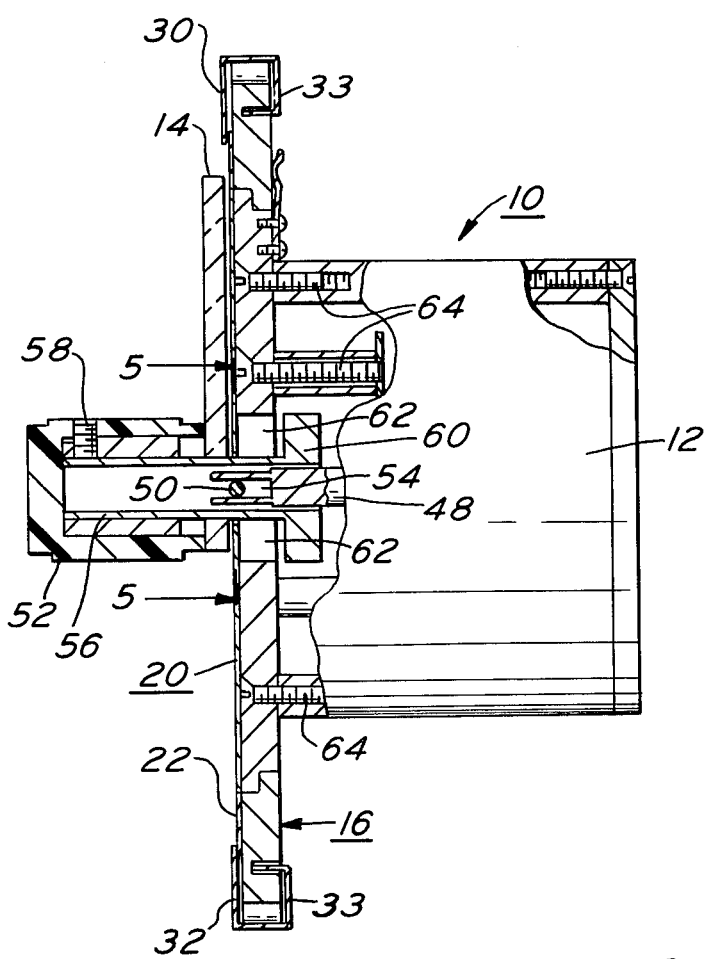
FIG. 5
FIG. 4
INVENTOR
WILLIAM J. CAMP
BY
Maleson, Kimmelman + Ratner
ATTORNEYS

APPARATUS AND METHOD FOR CALCULATING VEHICLE MOVEMENT PARAMETERS

BACKGROUND OF THE INVENTION

1. Field of the Invention

This invention relates to the field of determining vehicle movement parameters. In particular this invention pertains to an apparatus and method of determining an aircraft's elevation, speed, distance and time to arrive at a predetermined point during a landing approach.

2. Prior Art

In most cases, an aircraft operator is given no instruction as to ascertaining a proper glide slope into an airport. The usual method is to lower the aircraft elevation quickly, level the aircraft, and direct the aircraft toward the airport. Such a method relies heavily on visual observations and may be dangerous where obstructions may be encountered in the direct line of approach to the airport.

Some prior mechanisms provides electronic computation of the important aircraft movement parameters needed during a landing approach. However, such mechanisms require the aircraft operator to perform mental calculations such as subtracting altitudes from field elevations to find a relative aircraft height. These calculations must be performed during a time period when the operator is extremely busy and may cause a hazardous situation to arise. These prior mechanisms do not visually provide all of the necessary landing parameter data needed by the operator.

Additionally, previous electronic parameter computation equipment was mounted integral with the aircraft requiring additional FAA (Federal Aeronautics Association) inspection. Prior electronic mechanisms are also excessively costly to purchase and install, making them prohibitive to the average private aircraft operator.

SUMMARY OF THE INVENTION

A computing apparatus which includes means for time measurement during a specified time interval. A face plate is secured to the time measurement means and includes a first set of indicia formed thereon defining a nomograph. A translatable element which is moveable with respect to the face plate has formed thereon a second set of indicia.

BRIEF DESCRIPTION OF THE DRAWINGS

FIG. 3 is a perspective right angle exploded view of the frontal portion of the computing apparatus.

FIG. 4 is a side-elevation view of the assembled apparatus according to the present invention partially in section.

FIG. 5 is a sectional view of the pointer rotating mechanism taken along the section line 5—5 of FIG. 4;

DETAILED DESCRIPTION OF THE DRAWINGS

Figure 1:
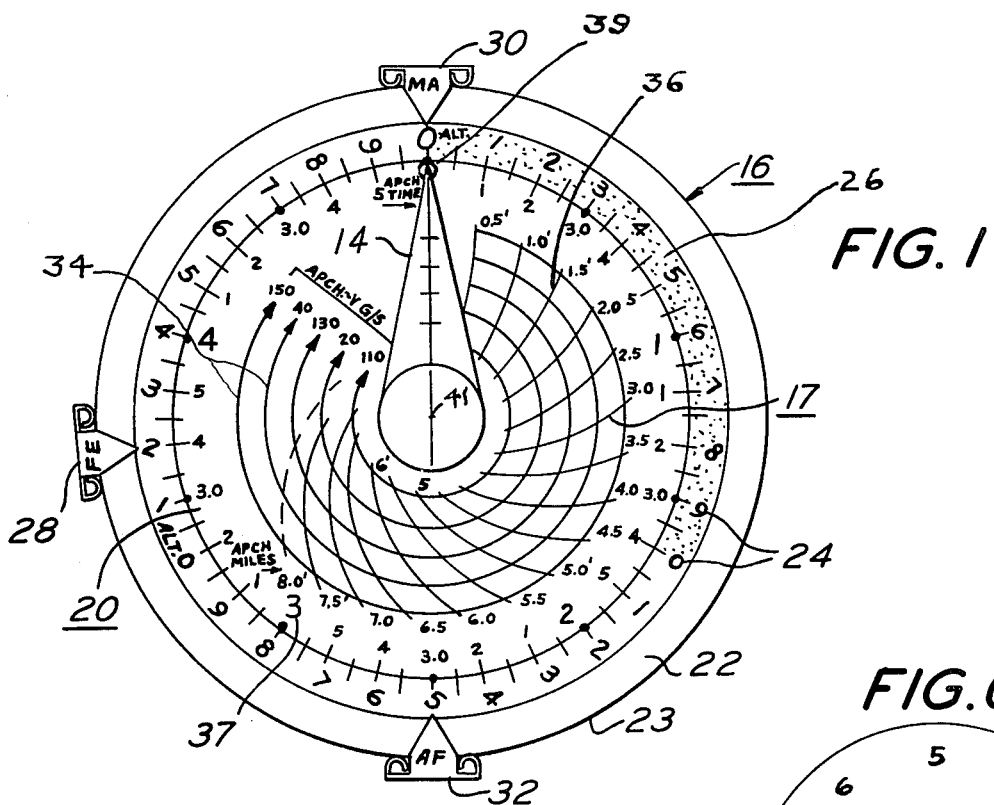
FIG. 1 is a frontal elevation view of the computing apparatus according to the present invention.

Referring now to FIGS. 1 through 4, there is shown an approach computer 10 to assist aircraft operators in planning and flying a precision glide slope on all instrument approaches to an airfield. The computing apparatus 10 basically includes a standard clock motor 12 for driving a settable pointer 14 in angular motion adjacent to a face plate 16 mounted on the forward end 18 of the clock motor 12. In this manner the clock motor 12 becomes a means for time measurement during some specified time interval as will be detailed in following paragraphs. The faceplate 16 has indicia which permits the operator to set the pointer 14 as a function of independent aircraft parameters. Upon initiation of the clock motor 12, the pointer 14 rotates across the faceplate 16 automatically giving a read-out of aircraft altitude and time remaining for the aircraft to reach a predetermined minimum altitude and/or field elevation necessary to the safe landing of the vehicle.

The faceplate 16 of the computer 10 includes both a clock face 20 rigidly mounted on end 18, and an outer annular altitude ring 22 rotatable with respect to the fixed clock face 20. The outer annular ring 22 is divided into three equal angular segments each bearing indicia 24 from 0 to 9 as shown in FIG. 1 and occupying respective 120° portions of the ring 22. The indicia markings in each segment as shown represent 100 feet of altitude of the aircraft above a predetermined point or some multiple thereof. While there are shown three individual altitude segments on ring 22, such is merely for representation sake and the ring may be divided into more segments if desirable. One segment of the altitude ring 22 is preferably designated as the minimum altitude segment 26 and is distinguished from the other segments by an individual coloring scheme or shading or some other easily visible means. This particular differentation between the segments permits the pilot or operator of the aircraft to easily ascertain that he is within a particular height range above the minimum altitude allowed and/or field elevation. The altitude segment 26 may represent altitudes from 0 to 1000 feet, for example, whereas the next segment may represent 1000 feet-2000 feet, and the next one to that 2000 feet-3000 feet.

Figure 2:
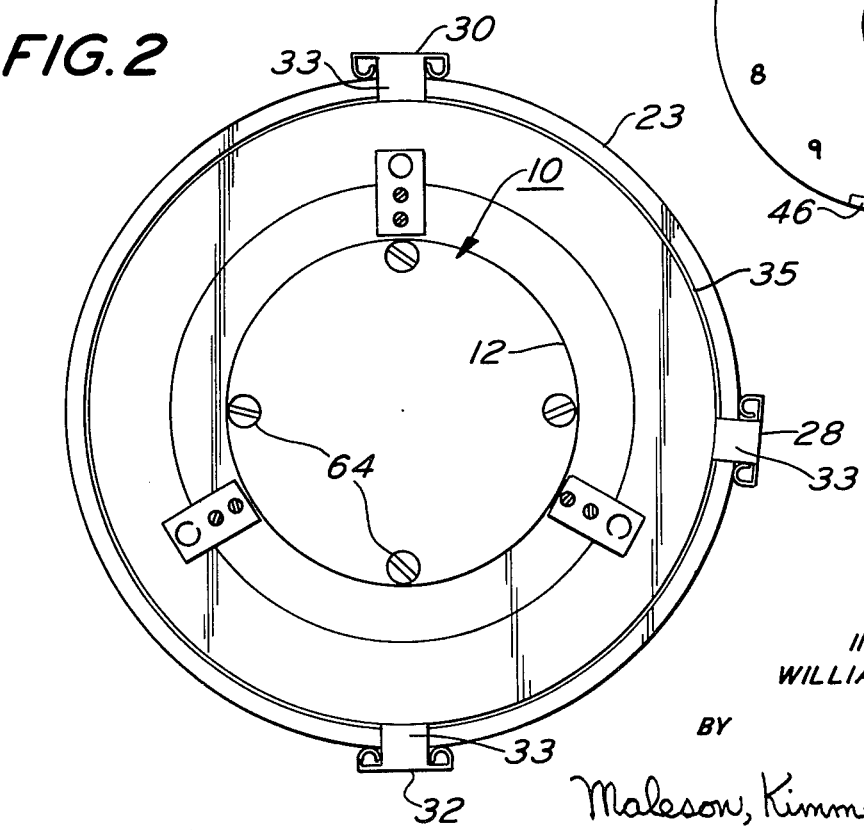
FIG. 2 is a rear elevation view of the computing apparatus.

Three tab elements 28, 30 and 32, shown in FIGS. 1 and 2 are slideably mounted on the outer ring periphery 23. Each one is manually moved by the operator to point to a predetermined marking on ring 22. The back face 33 of each tab is mounted within annular opening 35, as shown in FIG. 2.

The three tab elements shown are used in setting independent altitude references. The FE tab 28 is used to set the field elevation, the MA tab 30 is used to denote minimum altitude, and the final AF tab 32 is used to set the final approach fix. The field elevation tab 28 is manually moved to the proper indicia on ring 22 and represents the particular airfield elevation which is read from the standard approach charts supplied by the Federal Aeronautics Administration and made available to the operators of aircraft. The minimum altitude tab 30 is moved to a particular point on the ring 22 representing that altitude at which the operator must abort the landing if the airfield has not been visually sighted. Tab 30 is, in practice, always set in the altitude ring segment 26. The final approach fix tab 32 is also set by the operator at the altitude of the final approach fix of the aircraft in conjunction with the aforementioned approach charts. Additionally, each of tabs 28, 30 and 32 may be color distinguished in order to enable the pilot to easily identify the proper tab. In setting the tab elements around periphery 23 of ring 22, the minimum altitude tab 30 is preferably placed within the individual segment 26 in order that the pilot clearly realizes when the aircraft has reached the minimum altitude allowable. As is apparent, the transparent pointer 14 in the time decremented sequence will point to tabs 28 and 30 to properly alert the operator.

The clock face 20 which is rigidly mounted to the center of forward end 18 of clock 12 includes a nomograph having speed indicia 34 in the form of concentric arcs and aircraft mile indicia 36 in the form of curves intersecting those arcs. Additionally, the clock face 20 includes time indicia 37 equally spaced around the periphery of the face. The indicia 37, as shown, represent a total lapsed time of five minutes, but they may also be used with a slower running clock motor to indicate different time periods. The numeral "0" on the time scale 37 is designated at 39 and is prominently marked on the clock face 20 to provide an easily readable reference marker for the operator, the use of which will be detailed in following paragraphs.

As shown, the nomograph indicia comprises a cross-hatched pattern on the face 20 representative of the functional relationship between the approach velocity of the aircraft (represented by speed indicia 34) and the intersecting mile-distance indicia 36. The functional relationship between the basic parameters (AF, MA FE) and the nomographic cross-hatching is derived from a basic algorithm to be detailed in the following paragraphs.

The speed values may be defined by assuming constant displacement between consecutive rings. Thus, looking along a radial line from the center point 41 of the clock face 20, the increasing velocity parameter may be written: $(dV/dR) = K$ (1)

where
$V$ = aircraft speed
$R$ = ring radius on the clock face 20
$K$ = constant factor The integration of equation 1 between an initial and final aircraft velocity and circle radius gives the functional relationship between aircraft speed and the radius distance of the associated speed ring on the clock face 20. Therefore:

$$\int_{Vi}^{V} dV = \int_{Ri}^{R} K dR \qquad (2)$$

is solved to provide the basic equation:

$V = K(R - Ri) + Vi = KR + Vi - KRi$ (3)

where
$V$ = aircraft velocity at a speed radius equal to R (miles/hour)
$R$ = speed ring radius (inches)
$Ri$ = initially spaced speed ring (inches)
$Vi$ = initial velocity chosen associated with the initial speed ring Ri (miles/hour)
$K$ = constant factor G (miles/hour-inch)

Focusing attention on the clock motor 12, it is seen that the functional relationship between the angular movement of the pointer 14 and the time differential may be written:

$$\frac{\Delta\theta}{\Delta\tau} = \frac{360}{\Delta\tau_T} \qquad (4)$$

where $\Delta\theta$ = angular displacement of pointer during $\Delta\tau$ time interval (degrees)
$\Delta\tau$ = time interval for pointer to move $\Delta\theta$ (seconds)
$\Delta\tau_T$ = time for one complete pointer revolution (seconds)

Then equation 4 may be written:

$$\Delta\theta = \frac{360}{\Delta\tau_T} \Delta\tau \qquad (5)$$

Furthermore, at a particular speed ring radius, R, the time necessary to move the pointer through an angle equivalent to the approach time may be written:

$$3600 \frac{D}{V} = \Delta\tau \qquad (6)$$

where
$D$ = distance aircraft is away from landing point H (miles)
$V$ = aircraft velocity at a speed radius equal to RH (miles/hour)

Substituting equation (5/H) into 6 yields:

$$\frac{D}{V} = \frac{\Delta\tau_T}{360 \times 3600} \Delta\theta \qquad (7)$$

Now substituting equation 3 into 7 and rearranging appropriate terms, a definition of the indicia display is evaluated as a function of R, D, and the angular change:

$$R = \frac{360 \times 3600}{\Delta\tau_T \times \Delta\theta \times K} D - \frac{(Vi - KRi)}{(K)} \qquad (8)$$

As can be seen, when a five minute clock is used, the $\Delta\tau_T$ is equal to 300 seconds, and if the initial velocity Vi is assumed zero at an initial radius Ri of zero, then equation 8 becomes:

$$R = \frac{4320 \, D}{\Delta\theta \times K} \qquad (9)$$

From equation 8 it is now seen that the nomograph may now be drawn as a function of the independent variables in the system. By holding the variable R as a constant, various D intersections may be defined as intersecting the speed rings at different angles $\Delta\theta$.

The clock motor 12 as sectionally shown in FIG. 4 may be a standard mechanical timer such as the number 330 series produced by the Robertshaw Controls Company, Lux Time Division. The motor as shown is a 5 minute mechanical timer and as such, one complete rotation of the pointer 14 is completed in the prescribed 5 minute time interval. Rod member 48 extends into the spring driven motor and is torqued to provide the necessary wind up of the motor 12. Transverse rod 50 is attached on opposing sides to knob 52 and may be rotated clockwise or counterclockwise in response to the knob 52 rotation. Rod 50 passes through a slot 54 in the rod member 48 as shown. Therefore, knob 52 is rotationally constrained with respect to rod member 48, but is longitudinally free to move within the slot 54.

Inner knob sleeve 56 is secured to knob 52 through set screw 58 or some like means. Additionally sleeve 56 terminates at the rear in an annular portion 60 having an external diameter substantially equal to that of the recess 62 in face plate 10. When the knob 52 is pulled out, disk 60 engages shoulders 62 thereby locking the knob 52 and not permitting the unwinding of the clock motor 12. The pointer 14 is rigidly secured to the knob 52 and is moved in unison with it. Screws 64 pass through end portion 18 into the casing of motor 12 to affix members 18 and 22 to it.

In the position as shown in FIG. 4, knob 52 and associated pointer 14 may be rotated to a predetermined point on clock face 20. If the knob 52 were released by pushing it in, the rod 48 would begin moving as the spring driven motor 12 unwinds. Once the pointer 14 has been angularly positioned, the knob 52 may be pulled outward forcing disk 60 into frictional contact with the shoulders of recess thereby setting the pointer 14 and preventing unwinding of the spring motor. When the operator wishes to actuate the timer, the knob is pushed in, disk 60 is released from recess 62 and the pointer 14 starts to count down.

In operation, the operator or pilot of the aircraft prepares for landing by initially setting the field elevation tab 28, the minimum altitude tab 30, and the final approach fix tab 32 to appropriate ring indicia 24. The references used by the operator in these settings are read from standard flight charts provided by the Federal Aeronautics Administration (FAA).

The altitude ring 22 is then rotated with respect to clock face 20 until the previously set field elevation tab 28 is aligned with the "0" time index 39. The pointer 14 is rotated in a clockwise direction until it intersects the proper aircraft speed and approach mile distance indicia 34, 36 comprising the nomograph on the clock face 20. The knob 52 is pulled away from the face 20, thereby frictionally locking or setting it in place. When the final approach fix distance has been reached, the operator pushes the knob 52 toward the clock face 20 to release the pointer 14 for movement in a counterclockwise direction to the "0" 39.

As the clock pointer 14 counts down from the time set on the final approach fix to the zero point 39, the time remaining to go is shown directly by the indicia 37 formed on the outer periphery of the clock face 20. As can be seen, movement of the pointer 14 details the time remaining to the landing point, the miles from the end of the runway as well as the missed approach point and the prescribed altitude of the aircraft assuming a descent rate corresponding to the pointer's indication.

In the embodiment as depicted in the figures, the altitude indicia 24 are positioned for a descent rate of the aircraft corresponding to 600 feet per minute. Therefore each ten seconds on the clock 12 corresponds to one hundred feet on the altitude ring. When the pointer 14 is in motion during an approach, the computer 10 is set for a descent rate equal to six hundred feet per minute. However, this rate may be changed by using the fact that a new time per hundred feet is equal to the base six hundred times ten seconds divided by the new descent rate. Once the new time per hundred feet is calculated, the operator may expand the altitude scale markings 24 by the base times ten seconds added to the new time.

From the above discussion, it is seen that the indicia 34 and 36 provide a nomograph permitting the operator two means of selecting his approach requirements. These requirements may either be in the time to landing or in distance from the runway. In this way, the aircraft operator is cognizant at every point along his approach of the time to the missed approach point as well as of the distance of the aircraft from the runway.

Figure 6:
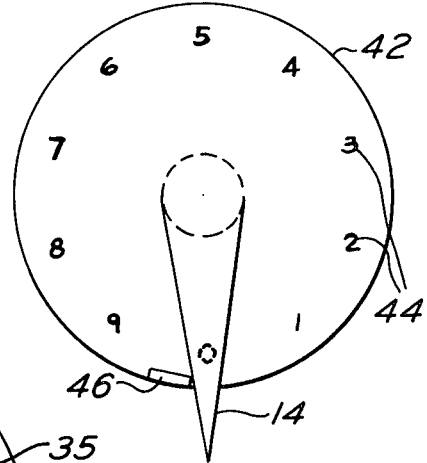
FIG. 6 is front elevation view of a transparent indicia-bearing disk used in one embodiment of the computing apparatus.

Another embodiment of the instant invention is shown in FIG. 6 in which a transparent plate 42 covers clock face 20. Plate 42 is positioned between the pointer 14 and the clock face 20 and is rotatable about the sleeve 56. The transparent plate 42 may be used by the operator in ascertaining the distance the aircraft has traveled from a particular point after the initial setting of the pointer 14. Indicia 44 are marked on the face of the plate 42 in equal angle segments between 0 and 9 to represent the miles traveled from the desired point. Tab 46 extends above the surface of the plate 42 into the path of clockwise travel of the pointer 14. Therefore, when the pointer 14 is rotated clockwise, the plate 42 is correspondingly rotated with respect to the clock face 20. During counterclockwise movement of the pointer 14, the DME plate 42 remains stationary with respect to the clock face 20. In this manner, the distance from the initial location may be read in miles by the operator by noting the position of the pointer 14 with respect to indicia 44 during the aircraft approach.

Obviously many modifications and variations of the present invention are possible in light of the above teachings. It is therefore to be understood, that within the scope of the appended claims, the invention may be practiced otherwise than is specifically described.

What is claimed is:

1. An aircraft navigational computing apparatus comprising:
   a. means for indicating time during a specified time interval, said means including a powered rotary pointer,
   b. a clock face mounted adjacent said time indicating means and having a first set of navigational indicia including time and distance indicia, said clock face means being stationary,
   c. annular means mounted toward the periphery of said clock face means which may be manually rotated to a predetermined setting, said annular means having altitude indicia formed thereon, and
   d. a plurality of tabs mounted in proximity to said annular means for indicating predetermined points thereupon, said plurality of tabs including a tab for indicating the minimum altitude and the final approach altitude.

2. The navigational computing apparatus according to claim 1 wherein said plurality of tabs also include a tab representing the elevation of the landing field.

3. A computer for use in aircraft for correlating the distance to be travelled by an aircraft moving at a predetermined speed from a fixed point on an approach to a landing field with the altitude to be maintained by the aircraft during the approach to the field, comprising a clock mechanism having a face, a shaft extending from the clock mechanism through the face thereof and rotatable by said clock mechanism, a pair of dials each having a different diameter and mounted concentrically about said shaft at said face, one of said dials having suitable indicia thereon for indicating the distance to be travelled and the other of said dials having suitable indicia thereon to indicate the altitude to be maintained, said dials being mounted for relative rotation of one to the other, a pointer mounted on said shaft for rotation therewith and movable with respect to at least one of said dials, and one of said dials being movable relative to a reference mark on the other dial to indicate the altitude of the landing field, so that the distance to be travelled and the altitude to be maintained can be correlated one to the other.

4. A computer as in claim 3, wherein said other dial with altitude indicia thereon is larger in diameter than said one dial and is rotatably mounted about said shaft on the face of said clock mechanism.

5. A computer as in claim 4, wherein said pointer is movable relative to both dials to give an indication of both the altitude to be maintained and the distance to be travelled.

6. A computer as in claim 4, wherein said one dial with distance indicia thereon is connected to move with said pointer.

7. An aircraft navigational computing apparatus comprising:
   a. movable powered indicating means for time indication during a specified time interval,
   b. stationary round planar means mounted adjacent said time indicating means and having a first set of navigational indicia formed thereon defining a nomograph, said planar means also having time lapse indicia disposed thereon concentric with said nomograph, and
   c. manually movable annular means bearing a second set of navigational indicia related to said first set, said annular means having an internal diameter substantially equal to the diameter of said stationary round planar means and being situated adjacent the periphery of said stationary round planar means and being rotatably movable with respect thereto, said powered indicating means including means for visually correlating said first and second sets of navigational indicia.

8. The apparatus according to claim 7 wherein said nomograph relates velocity and distance.

9. The apparatus according to claim 8 wherein said nomograph is formed in accordance with the algorithm.

10. The apparatus according to claim 7 also including a plurality of tabs slideably moveable adjacent said annular means.

11. The apparatus according to claim 1 with the addition of a transparent disc with a third set of indicia formed thereon, said transparent disc being concentric and rotatable with respect to said stationary round planar means and said indicia indicating distance.

12. The navigational apparatus according to claim 1 wherein said first set of indicia indicates velocity and distance and said second set indicates altitude.

13. The navigational computing apparatus according to claim 7 wherein said nomograph is disposed inwardly of said time lapse indicia and comprises velocity and distance data.

14. An aircraft navigational computing apparatus comprising:
   a. means for time indication during a specified time interval,
   b. a clock face mounted adjacent said time indicating meansand having a first set of navigational indicia formed thereon defining a nomograph,
   c. means adjacent the periphery of said clock face and being mounted for rotational movement with respect thereto, said movable means having a second set of navigational indicia formed thereon which is related to said first set, and
   d. a plurality of movable tabs which are manually settable to desired points on said means adjacent the periphery of said clock face.

15. The navigational computing apparatus according to claim 14 wherein said tabs indicate predetermined altitude points on said second set of indicia.

* * * * *